C. M. YODER
March 7, 1933. Re. 18,760
MACHINE FOR AND PROCESS OF FORMING METAL INTO SHAPES
Original Filed May 24, 1926 4 Sheets-Sheet 1
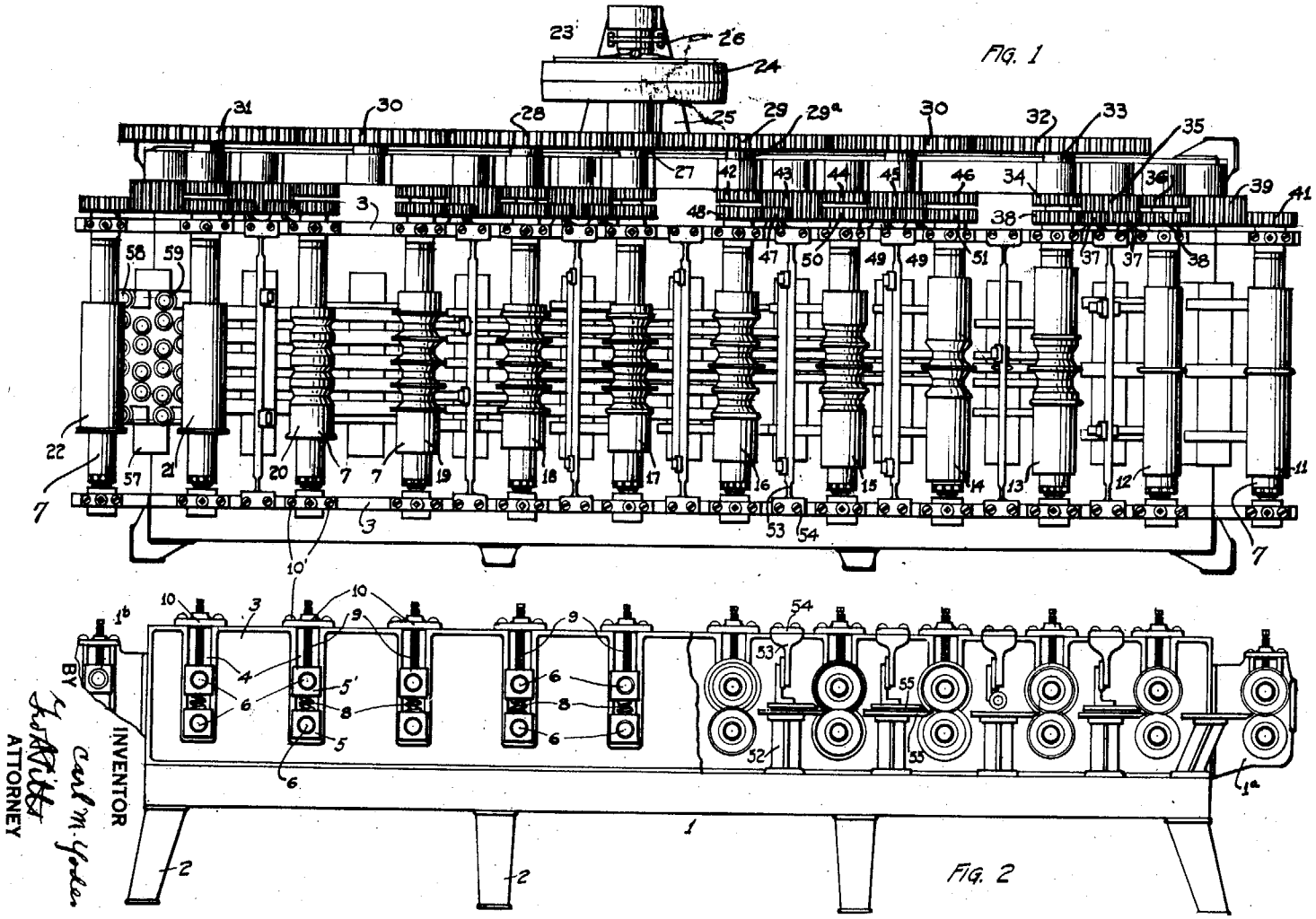

C. M. YODER
MACHINE FOR AND PROCESS OF FORMING METAL INTO SHAPES
March 7, 1933.
Re. 18,760
Original Filed May 24, 1926 4 Sheets-Sheet 2
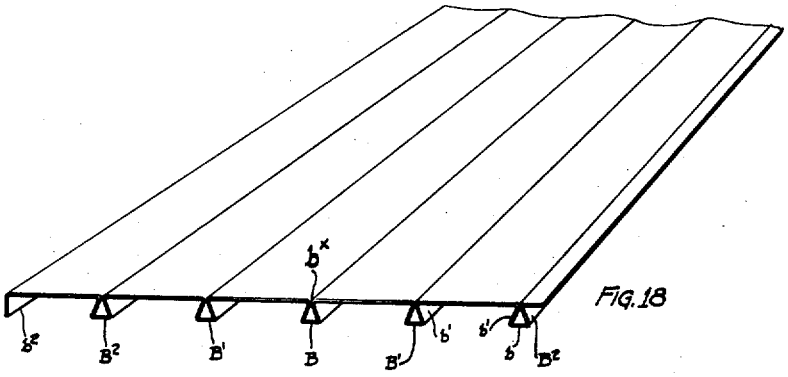
FIG. 18
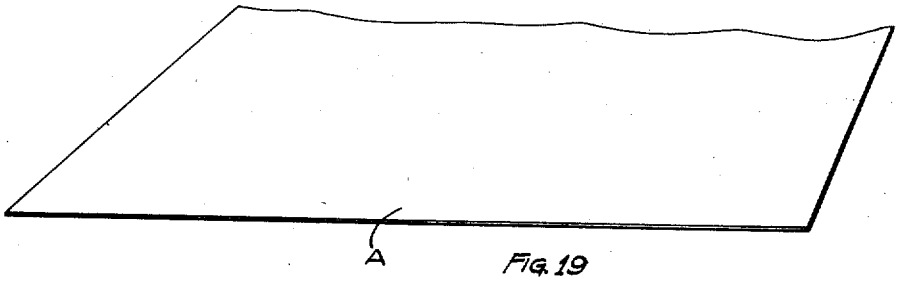
FIG. 19
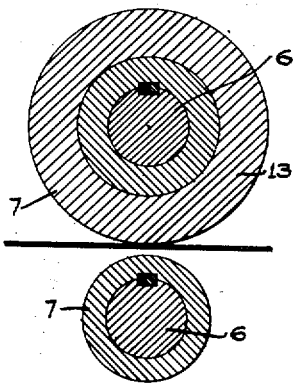
FIG. 3
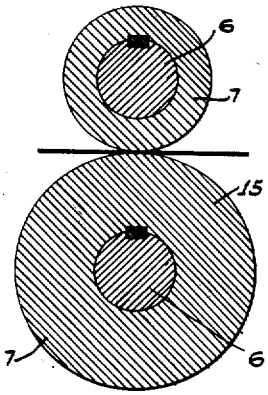
FIG. 4
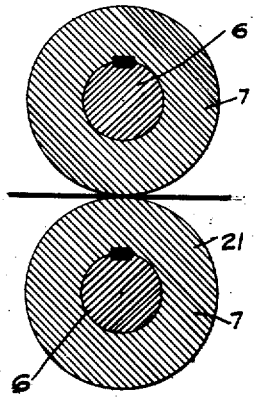
FIG. 5
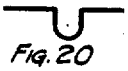
FIG. 20
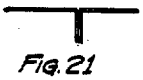
FIG. 21
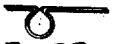
FIG. 22
FIG. 23
INVENTOR
Carl M. Yoder
BY Geo. A. Fitts
ATTORNEY

C. M. YODER

March 7, 1933. Re. 18,760

MACHINE FOR AND PROCESS OF FORMING METAL INTO SHAPES

Original Filed May 24, 1926 4 Sheets-Sheet 3

Inventor: Carl M. Yoder
By Geo. B. Stubbs Atty

C. M. YODER

March 7, 1933. Re. 18,760

MACHINE FOR AND PROCESS OF FORMING METAL INTO SHAPES

Original Filed May 24, 1926 4 Sheets-Sheet 4

Inventor:
Carl M. Yoder
By Geo. A. Pitts Atty

Reissued Mar. 7, 1933

Re. 18,760

UNITED STATES PATENT OFFICE

CARL M. YODER, OF LAKEWOOD, OHIO

MACHINE FOR AND PROCESS OF FORMING METAL INTO SHAPES

Original No. 1,770,963, dated July 22, 1930, Serial No. 111,196, filed May 24, 1926. Application for reissue filed July 8, 1931. Serial No. 549,524.

This invention relates to a machine for and process of forming sheet metal into shapes, more particularly for shaping metal sheets to impart to them strength and rigidity, whereby they may be used for various construction purposes, including flooring, roofing, side walls, linings, sheathing and the like.

In certain adaptations of the sheet metal sections produced according to my process, they are used as foundations for roofing, floors, and walls or in a manner similar to shingling, weather boarding and in any of such uses the sections may be covered, for insulation or otherwise, by any desired material in sheet or plastic form.

One object of the invention is to provide an improved machine of this character that is relatively simple in construction and has large capacity.

Another object of the invention is to construct a machine of this character capable of forming in metal sheets one or more longitudinal grooves or channels of any desired shape in cross section without affecting the structural or molecular condition of the metal between the groves or channels.

Another object of the invention is to provide an improved process of shaping sheet metal sections to form in them reinforcements of any desired shape in cross section.

Another object of the invention is to provide an improved process of shaping sheet metal sections to form in them one or more hollow ribs.

Other objects of the invention will be apparent to those skilled in the art to which my invention relates from the following description taken in connection with the accompanying drawings.

Fig. 1 is a top plan view of a machine embodying my invention and capable of carrying out the steps of my process.

Fig. 2 is a side view of the machine, with parts broken away.

Fig. 3 is a section on the line 3—3 of Fig. 7.

Fig. 4 is a section on the line 4—4 of Fig. 9.

Fig. 5 is a section on the line 5—5 of Fig. 16.

Figs. 6 to 16, inclusive, are fragmentary views of the several pairs of shaping rolls showing the various steps of shaping the sheet metal to form the same into final form.

Figure 17:
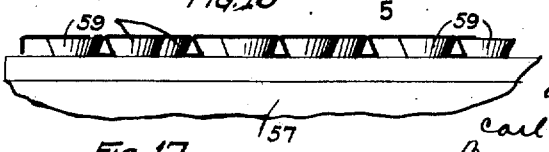

Fig. 17 is a transverse section of the product after passing thru the machine and as discharged from the last set of rolls.

Fig. 18 is a perspective view showing a portion of the finished product.

Fig. 19 is a perspective view of a portion of one of the metal sheets before passing through the machine.

Figs. 20, 21, 22 and 23 are fragmentary sectional views showing modified forms of channels and ribs which may be formed according to my process.

Referring to the drawings, 1 indicates as an entirety a frame preferably mounted on legs 2. 3 indicates a pair of spaced members, mounted vertically on the frame 1 and extending longitudinally thereof from end to end. The members 3 are provided with aligned recesses or openings 4, and in them are slidably and removably mounted pairs of bearing boxes 5, 5′ each supporting one end of a shaft 6, carrying a roll 7 to which reference will later be made. The bearing boxes 5, 5′, are mounted one above the other so as to support the rolls 7 in pairs in operative relationship for purposes which will later appear. The bearing boxes 5, 5′, are provided with ways on their opposite sides which engage the opposing walls of the openings 4, whereby they are guided into position, the lower box 5 preferably being seated on the end wall of the adjacent opening 4. Between adjacent pairs of bearing boxes a spring is interposed and operating normally to move the upper box 5′ upwardly, 9 indicates screws mounted in plates 10, each of which extends across or bridges the upper or open end of one of the openings 4, each plate 10 being secured to the upper wall of the member 3 in any desired manner, preferably by cap screws 10′, as will be understood by Figs. 1 and 2. The screws 9 engage the upper bearing boxes 5′ so as to adjust and maintain them in any predetermined relationship relative to the lower bearing boxes in opposition to the tension of the springs 8. By this arrangement and construction, the upper roll of each pair may be spaced varying distances from the lower roll dependent upon the gage of the metal sheet being shaped. The mountings for the opposite ends of the rolls 7 are preferably similar.

$1^a$, $1^b$, indicate pairs of brackets supported at the opposite ends of the frame 1 and forming mountings for additional pairs of rolls 7 to which reference will later be made.

In the present form of construction I provide a plurality of pairs of rolls arranged in spaced relation, preferably equal distances from each other, longitudinally of the machine. For the purpose of identification of the several pairs of rolls, they are designated 11, 12, 13, 14, 15, 16, 17, 18, 19, 20, 21, and 22, respectively.

23 indicates as an entirety the driving means for rotating the sets of rolls 7. Of these driving means, 24 indicates a pulley loosely mounted on a transverse shaft, which is mounted in a bracket 25, extending laterally from one side of the frame 1. 26 indicates a clutch having one element movably mounted on and keyed in any suitable manner to the driven shaft, the other element of the clutch being secured to the pulley 24 so that when the clutch is thrown in, the power transmitted to the pulley 24 will be transmitted to the transverse shaft in a well known manner.

27 indicates a pinion mounted on the transverse driven shaft and meshing with gears 28, 29. By preference the transverse driven shaft is mounted intermediate the ends of the frame 1 and the drive for the sets of rolls 7 extend in opposite directions from said shaft, so that the pinion 27 drives the gears 28, 29, and these gears in turn drive idlers 30 and the latter drive gears 31, 32, respectively, as is clearly shown in Fig. 1. By preference each of the gears 31, 28, 29 and 32 drive three sets of rolls 7 in the following manner: 33 indicates the extended end of the shaft 6 carrying the lower roll 7 of the set of rolls 13. 34 indicates a gear fastened to the shaft 33 and meshing with a gear 35 mounted on a stud shaft intermediate the sets of rolls 12, 13. The gear 35 meshes with a gear 36 mounted on the extended end of the shaft 6 for the lower roll of the set of rolls 12. 37 indicates idlers suitably mounted on the adjacent frame member 3 and meshing with the gear 35. The idlers 37 in turn mesh with gears 38 fixed to the extended ends of the shafts 6 carrying the upper rolls 7 of the sets of rolls 12, 13, so that the respective rolls of these sets are driven in opposite directions. 39 indicates a gear meshing with the gear 36 and loosely mounted on a stud shaft carried by the adjacent member 3.

The gear 39 meshes with a gear fixed to the shaft 6 of the lower roll 7 of the set of rolls 11, and this gear in turn meshes with a gear 41 fixed to the shaft 6 of the upper roll 7 of this latter set, whereby both rolls are positively driven in opposite directions. As just set forth it will be seen that the sets of rolls, 11, 12, 13, are driven from the gear 32.

The set of rolls 20, 21 and 22 are driven in a similar manner to the sets of rolls 11, 12 and 13 except that the gears are reversely arranged.

The sets of rolls 14, 15 and 16 are driven as follows: The gear 29 is fixed to the extended end 29*a* of the shaft 6 for the lower roll 7 of the set of rolls 16 and this shaft 29*a* carries a gear 42 which meshes with an idler 43. The idler 43 in turn meshes with a gear 44 fixed to the shaft 6 of the lower roll 7 of the set of rolls 15. The gear 44 meshes with an idler 45 which in turn meshes with a gear 46 fixed to the shaft 6 of the lower roll 7 of the set of rolls 14. 47 indicates an idler in mesh with the idler 43 and also in mesh with gear 48 fixed to the shaft 6 of the upper roll 7 of the set of rolls 16. 49 indicates idlers in mesh with the idler 45 and meshing with gears 50, 51, fixed to the shafts 6 of the upper rolls 7 of the sets of rolls 14 and 15; whereby the sets of rolls 14, 15 and 16 are driven from the gear 29, the rolls of each set being driven in opposite directions.

The sets of rolls 17, 18 and 19 are driven by the gear 28 in a manner similar to the rolls 14, 15 and 16 and for that reason it will not be necessary to describe the driving elements therefor.

In my process of shaping sheet metal, a sheet thereof is passed through the sets of rolls 11, 12, 13, 14, 15, 16, 17, 18, 19, 20, 21 and 22 successively from end to end of the machine and the shaping takes place progressively in the manner to be later set forth. For the purpose of supporting the sheet between the sets of rolls, I provide upper and lower cross members 52, 53, the lower members being supported on the frame 1 and the upper members being supported at their opposite ends by suitable flanges 54. The inner ends of these cross members carry guides 55, disposed in spaced relation so as to receive between them the sheet of metal and thus guide it from one set of rolls to the next set of rolls. These guides and the supporting members may be of any desired construction, and arranged to accommodate the metal sections as shaping thereof progresses.

In the present form of construction and process of shaping the sheet metal A, the latter is formed with one or more channels or grooves B, B′, $B^2$, in parallel relationship and extending from end to end of the section or sheet of metal. These channels or grooves may be of varying shapes in cross section, but in the illustrated form of construction, the grooves have bottom walls *b* and side walls *b'*. Furthermore, I prefer to impart to the metal additional steps whereby the side walls of the metal are compressed or brought together along their inner edges, or those edges that are contiguous to the body portion of the sheet A, so that the side walls are inclined relative to each other, thereby forming hollow ribs (triangular in shape in the illustrated form of construction), on one side of the sheet and making the other side of the sheet A substantially a contiguous plane between its side edges.

However, the invention is not to be limited to the illustrated form of construction wherein the channels or the ribs are disposed on the same side of the metal sheet section A, as they may be otherwise arranged, certain thereof on one side of the section and the others on the opposite side, since any of these arrangements may be effected by changing the rolls 7 to suit the desired conditions.

By reason of the fact that the metal forming the bottom and sides of the channels or ribs are formed from portions intermediate the opposite side edges of the sheet metal section A, my process involves the formation of the ribs in successive or progressive order, so that ample metal is provided for the walls of each channel or rib and the intermediate portions of the metal constituting the resulting product.

In forming the channels or ribs, I may form the first channel along either side edge of the sheet metal section A and progressively form the remaining channels or ribs at spaced points laterally toward the opposite side edge of the sheet metal section A. To simplify the construction of the machine and to increase the speed of operation, I prefer to start and form the first channel or groove at a point between the side edges of the sheet, preferably midway therebetween, and to thereafter successively start and form a pair of channels at either side of the first channel formed and then at the outer sides of the first pair of channels so formed to form another pair of channels and so on until channels have been progressively formed at either side of the first channel throughout the width of the sheet metal. In the illustrated form of construction, five channels or ribs are shown, but by spacing them closer together or by using a sheet of greater width, a larger number of channels or ribs may be provided. Furthermore, while I have shown a form of construction in which one channel is first formed and pairs thereof are formed progressively at either side thereof, it will be obvious that one or more channels may be formed at either side of the first channel irrespective of the number formed on the other side thereof.

Figure 6:
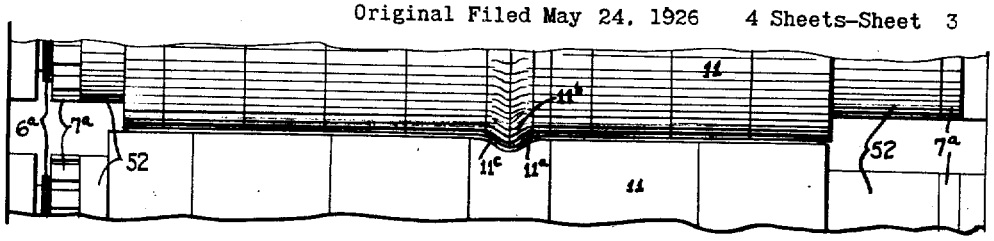
Figure 7:
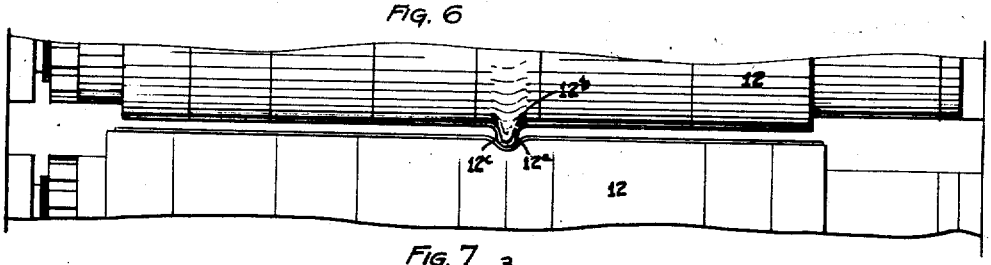
Figure 8:
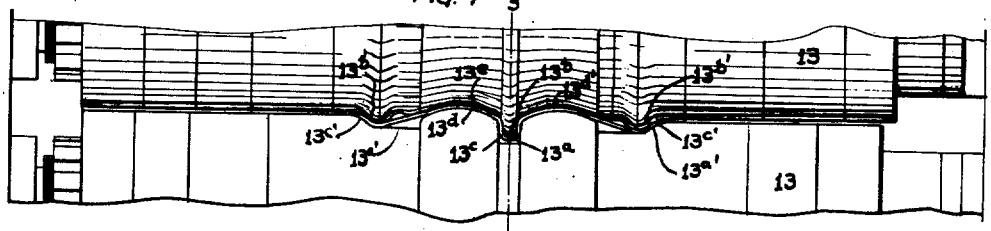
Figure 9:
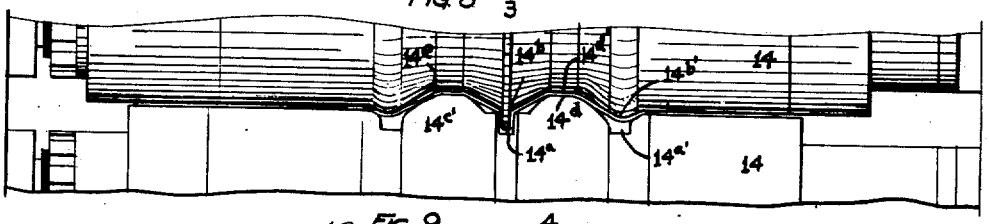
Figure 10:
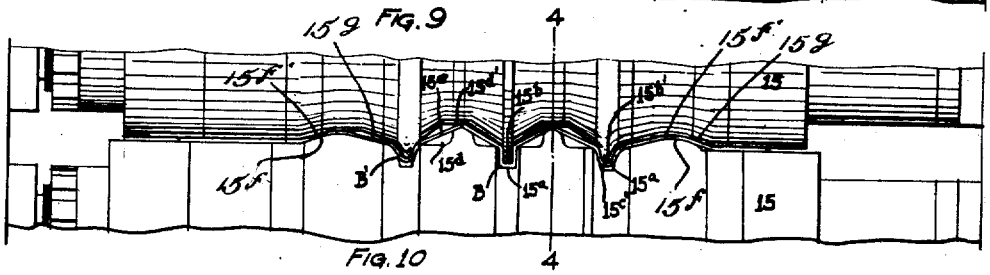
Figure 11:
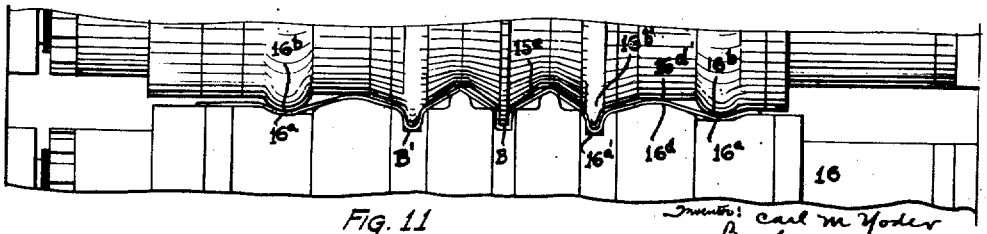
Figure 12:
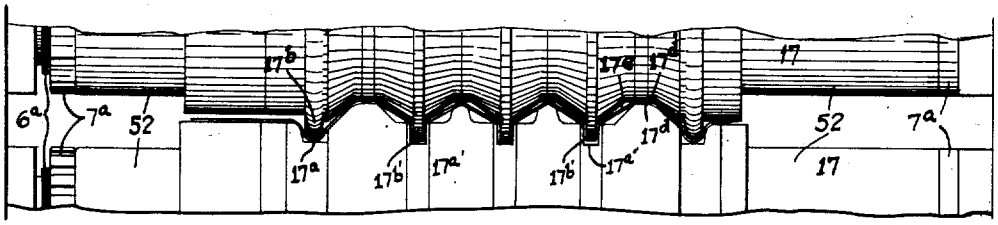
Figure 13:
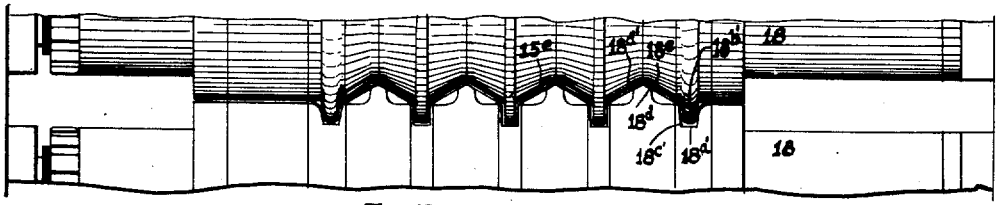
Figure 14:
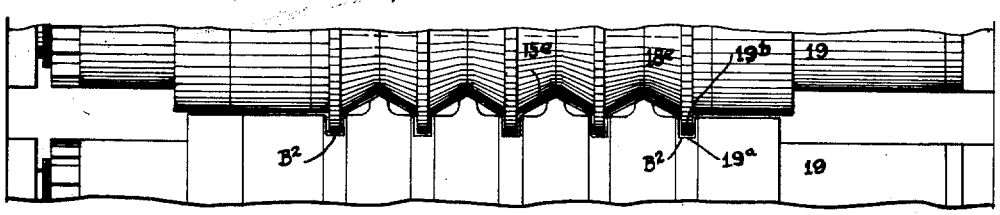
Figure 15:
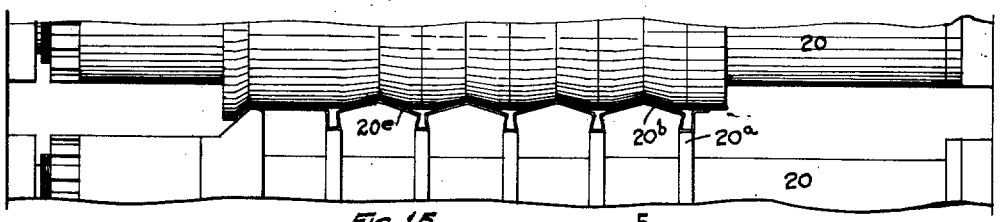
Figure 16:
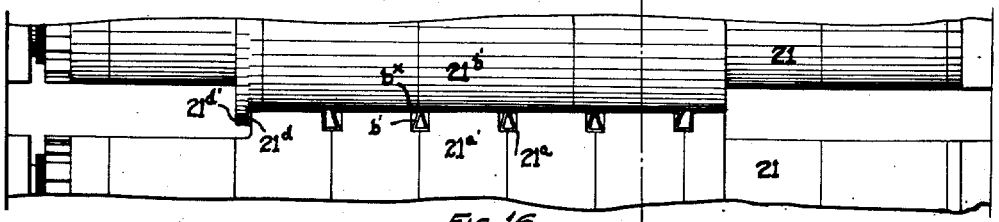

The section of metal A is first passed between the set of rolls 11 (see Fig. 6). As shown, these rolls are provided with a groove 11*a* and a rib 11*b*, respectively which co-operate to shape the metal as shown at 11*c*; next the metal section A passes between the set of rolls 12, which are formed with a groove 12*a* and a rib 12*b*, respectively, which cooperate to shape the metal as shown at 12*c*; next the metal section A passes between the set of rolls 13, which are formed with a recess 13*a* and a rib 13*b*, respectively, which cooperate to shape the metal as shown at 13*c*, thereby completely forming a channel or groove B having a bottom wall *b* and side walls *b'*. Next, I start to shape the metal at either side of the first groove B to simultaneously form the channels B' at either side of the channel B. The starting of the channel B' is preferably provided for in the set of rolls 13, these rolls being provided with grooves 13*a'* and rib 13*b'* respectively which cooperate to shape the metal as shown at 13*c'*; also, to provide for the compressing of the side walls *b*, *b'*, of the channels B, B', B² together, to form hollow ribs the rolls 13 are shaped intermediate the grooves 13*a*, 13*a'* and ribs 13*b*, 13*b'*, with correlated shaping portions 13*d*, 13*d'*, which bend the metal upwardly as shown at 13*e*. Next, the sheet metal section A passes to and between the set of rolls 14 which are provided with a groove 14*a* and a rib 14*b* corresponding to the channel B which has been previously formed; these rolls are also formed with grooves 14*a'* and ribs 14*b'* which shape the sheet metal into the form shown at 14*c'*; also between the grooves 14*a*, 14*a* and the ribs 14*b*, 14*b'*, respectively, the rolls 14 are provided with correlated shaping portions 14*d*, 14*d'* which further bend the metal as shown at 14*e*. Next, the sheet metal section A is passed to and between the set of rolls 15 which are provided with a groove 15*a* and a rib 15*b* respectively to receive the channel B and with grooves 15*a'* and ribs 15*b'* respectively, which shape the metal as shown at 15*c'* to complete the ribs B'; also, intermediate the grooves 15*a*, 15*a'* and the ribs 15*b*, 15*b'*, the rolls are provided with correlated shaping portions 15*d*, 15*d'*, respectively, which complete the bending of the metal as shown at 15*e*, and at 15*f*, 15*f'*, the rolls 15, 15, are provided with correlating shaping portions which bend the metal upwardly, as shown at 15*g*. Next, the sheet metal section A is passed to and between the set of rolls 16 which are shaped to receive the channels B, B' and bent portions 15*e*; and also provided with grooves 16*a* and ribs 16*b* respectively, which cooperate to start the shaping of the next outer channels B²; also between the grooves 16*a'* and rib 16*b'* and the groove 16*a* and 16*b*, respectively, the rolls 16 are provided with correlated shaping portions 16*d*, 16*d'*, which further bend the metal between the channels B' and the portions of the metal which will form the channels $B^2$. Next the sheet metal A is passed to and between the rolls 17 which are shaped to receive the channels B, B′ and the bent portions 15*e* and also provided with grooves 17*a* and ribs 17*b*, respectively, which cooperate to shape the metal as shown at 17*c*; also between the grooves 17*a*, 17*a*′ and the ribs 17*b*, 17*b*′ respectively, the intermediate portions of the rolls 17 are provided with correlated shaping portions 17*d*, 17*d*′ which cooperate to bend the metal as shown at 17*e*. The section of metal A is then passed to and between the rolls 18 which are shaped to receive the channels B, B′, and bent portions 15*e*, and also provided with grooves 18*a* and ribs 18*b* respectively which cooperate to shape the metal as shown at 18*c* and between the grooves 18*a*, and 18*a*′ and ribs 18*b*, 18*b*′ respectively, the rolls are provided with cooperating shaping portions 18*d*, 18*d*′ respectively, which cooperate to bend the metal as shown at 18*e*. Next, the section of metal A is passed to and between the rolls 19 which are shaped to receive the channels B, B′, and the bent portions 15*e*, 18*e*, and are also provided with grooves 19*a* and ribs 19*b*, respectively which cooperate to complete the shaping of the channels $B^2$, $B^2$.

When the sheet section passes the rolls 19, the channels B, B′, $B^2$, are composed of bottom walls *b* and side walls *b*′, at right angles thereto and in one adaptation of the invention, the shaping process may be completed at this point except for the flanging of the sheet along one edge as shown at $b^2$ when such flange is desired. If the channels are to be shaped into this form, the intermediate bending operations already referred to, forming the bent portions 15*e*, 18*e*, will not be required, in which event the channels B, B′, $B^2$, will be formed and the intermediate portions of the metal will remain in normal or flat position. Where the process is continued so as to compress or bring the inner edges of the side walls *b*′ together, as illustrated in Figs. 17 and 18, the sheet metal section A is passed to and through the rolls 20 which comprise ribs 20*a* in alignment with the channels B, B′, $B^2$, and portions 20*b* which tend to partially flatten or straighten the intermediate portions 15*e*, 18*e*, as shown at 20*e*. Next, the sheet metal section A is passed to and between the rolls 21, which are formed with grooves 21*a* to receive the channels B, B′, $B^2$, and cooperating shaping portions 21*a*′, 21*b*′, respectively, which cooperate to completely flatten or straighten the bent portions 15*e*, 18*e*, thereby pushing or compressing the side walls *b*′ together at their inner edges, as shown at *bx*. Next, the sheet metal section A is bent along one side edge to form the flange $b^2$, the flanging elements for this step being preferably provided at 21*d*, 21*d*′, on the rolls 20, 21. From the rolls 21 the section of metal passes between the finishing rolls 22 which preferably correspond in shape to the rolls 21. Between the rolls 21, 22, the frame 1 is provided with a support 57 carrying a plurality of stud shafts 58 on which are loosely mounted guide rolls 59, which are arranged in pairs and cooperate to guide between them the channels B, B′, $B^2$, as shown in Fig. 17. Certain of the guide rolls 59 also function to move the outer side walls *b*′ of the channels $B^2$ and lateral portions of the metal section inwardly so as to complete the shaping of these outer hollow ribs.

As will be understood from Figs. 6 to 16, inclusive, each of the rolls of the several sets thereof are formed from sections which are shaped and correlated to provide the shaping and forming elements above referred to. These roll sections for each roll are slidably and removably mounted upon the adjacent shaft 6 between and clamped together by collars 7*a* one of which is fixed to the shaft 6 near one end thereof and the other of which constitutes a nut engaging a screw threaded portion 6*a* provided on the shaft near its other end. By this form of construction it will be seen that the shaping elements of each set of rolls may be readily adjusted transversely of the shaft and also disposed in any desired spaced relation relative to each other, so that the channels may be spaced from each other any desired distance. Furthermore, it permits the shaping elements to be removed and other shaping elements substituted so as to provide for channels of different shapes in cross section. To provide for the positioning of the roll shaping sections, sleeves 52 of the desired length are interposed on the shafts 6 between the outer shaping sections and the collars 7*a* and sleeves, collars or shims may be positioned between the shaping sections when required.

From the foregoing description it will be seen that I provide for the shaping of sheet metal sections in a rapid manner and for the forming of a plurality of channels or ribs without distorting the intermediate portions of the metal or affecting its molecular condition. The resulting product may be used for various purposes including sheathing, foundations for walls, flooring, roofing, partitions and the like; also for reinforcement of concrete walls; also, the metal sections may be used as supports for a covering, including materials in sheet or plastic form. In the assembly of the sections, the channels or ribs may be secured to suitable supports or these elements may be disposed on the outer side of the sections in which event they will serve as an anchor or bond if plastic or cementitious material is used. In such uses, the channels or ribs impart to the metal sections strength and rigidity and therefore provide an adequate support with minimum weight.

To permit the sections to be readily correlated together, the flange $b^2$ on one section is inserted in between the side walls $b'$ of the outer rib of the other section so as to form a continuous roofing, flooring or wall, or a foundation therefor.

From the foregoing description, it will be obvious that by changing the shapes of the roller sections, varying shapes of channels or reinforcing ribs may be formed on the sheet metal sections, examples of which are shown in Figs. 20, 21, 22 and 23.

To those skilled in the art to which my invention relates many changes therein and widely differing embodiments and applications of the invention will suggest themselves without departing from the spirit and scope thereof. My disclosures and the description herein are purely illustrative and are not intended to be in any sense limiting.

What I claim is:

1. The herein disclosed process which consists in passing a section of metal through and between sets of rolls, and first forming therein a channel, then in oppositely bending portions of the metal at one side of the channel, then in forming in the metal section a channel along the outer edge of the bent portion, and finally flattening the bent portion of the metal.

2. The herein disclosed process which consists in passing a section of metal through and between sets of rolls, and first forming therein a channel, then in oppositely bending portions of the metal at one side of the channel, then in forming in the metal section a channel laterally of the outer edge of the bent portion, then in flattening the bent portion of the metal, and finally drawing inwardly the outer side walls of the outer channel.

3. The herein disclosed process which consists in passing a section of metal through and between sets of rolls, and first forming therein a channel, then oppositely bending portions of the metal lateral to the channel and forming a channel along the outer edge of the bent portion, and finally bending the side walls of each channel toward each other at their inner portions.

4. The herein disclosed process which consists in passing a section of metal through and between sets of rolls, and first forming therein a channel, then in oppositely bending portions of the metal lateral to the channel and forming a channel laterally of the outer edge of the bent portion and finally flattening the bent portion.

5. The herein disclosed process which consists in passing a section of metal through and between sets of rolls, and first forming therein a channel, then in oppositely bending portions of the metal lateral to the channel and forming a channel laterally of the outer edge of the bent portion, then in simultaneously oppositely bending the lateral portions of the metal and forming a channel laterally of the outer edges of the bent portion, and finally bending the side walls of each channel toward each other at their inner portions.

6. The herein disclosed process which consists in passing a section of metal through and between sets of rolls, and first forming therein a channel, then in oppositely bending portions of the metal lateral to the channel and forming a channel laterally of the outer edge of the bent portion, then in oppositely bending the lateral portion of the metal and forming a channel laterally of the outer edges of the bent portion, and finally in flattening the bent portions.

7. The herein disclosed process which consists in passing a section of metal through and between sets of rolls, and first forming therein a channel, then in simultaneously oppositely bending portions of the metal lateral to the channel and forming channels laterally of the outer edges of the bent portions, then in flattening the bent portions, and finally in drawing in the outer walls of the last formed channels.

8. In a machine of the class described, the combination of a frame, sets of rolls mounted thereon and arranged to receive between them a section of sheet metal, means for driving said rolls, one set of rolls being shaped to form a longitudinal channel in the metal section with adjacent oppositely bent portions and a succeeding set of rolls serving to form therein a longitudinal channel parallel to the first channel and beyond said bent portions, and means for bending the side walls of each channel toward each other at their inner portions.

9. In a machine of the class described, the combination of a frame, sets of rolls mounted thereon and arranged to receive between them a section of sheet metal, means for driving said rolls, one set of rolls being shaped to form a longitudinal channel in the metal section with adjacent oppositely bent portions and a succeeding set of rolls serving to form therein a pair of channels one at either side of the first channel beyond said bent portions and parallel thereto, and means for bending the side walls of each channel toward each other at their inner portions.

10. In a machine of the class described, the combination of a frame, sets of rolls mounted thereon and arranged to receive between them a section of sheet metal, means for driving said rolls, one set of rolls being shaped to form a longitudinal channel in the metal section and succeeding sets of rolls serving to form therein an oppositely bent portion laterally of the channel and a separate channel beyond the edge of the bent portion, and means for bending the side walls of each channel toward each other at their inner portions.

11. The herein disclosed process which consists in passing a sheet of metal through and between sets of rolls, first forming therein a channel, then bending an adjacent portion of the metal out of the plane of the sheet and oppositely from the channel, forming a second channel laterally of the outer edge of the bent portion and finally flattening the bent portion back into the plane of the sheet.

12. In a machine of the class described, the combination of a frame, sets of rolls mounted thereon and arranged to receive between them a section of sheet metal, and means for driving said rolls, one set of rolls being shaped to form a longitudinal channel in the metal sheet and to bend the adjacent portions of the sheet out of the plane thereof, and succeeding sets of rolls being shaped to form a second longitudinal channel in the metal sheet and to bend the said portions of the sheet back into the original plane thereof.

13. The herein disclosed process which consists in passing a sheet of metal through and between sets of rolls first to form therein a channel and then bending adjacent portions of the metal out of the plane of the sheet, alternate bent portions thereof forming channels, and finally flattening the bent portions between the channels back into the plane of the sheet.

14. In a machine of the class described, the combination of a frame, sets of rolls mounted thereon and arranged to receive between them a section of sheet metal, one set of rolls being shaped to form a longitudinal channel in the metal section and succeeding sets of rolls serving to form therein an oppositely bent portion laterally of the channel and a separate channel beyond the edge of the bent portion, means for bending the side walls of each channel toward each other at their inner portions, a drive for said rolls in said sets, comprising a gear system between the several rolls of the several sets to drive all of them, and a main drive for said gear system located substantially centrally intermediate the said gear system, for the purpose described.

15. In a machine of the class described, the combination of a frame, sets of rolls mounted thereon and arranged to receive between them a section of sheet metal, means for driving said rolls, one set of rolls being shaped to form a longitudinal channel in the metal section and the other set of rolls serving to form therein separate channels at either side of the first mentioned channel, and means for straightening the walls of alternate channels into a common plane.

16. In a machine of the class described, the combination of a frame, sets of rolls mounted thereon and arranged to receive between them a section of sheet metal, means for driving said rolls, one set of rolls being shaped to form a longitudinal channel in the metal section and the other set of rolls serving to form therein a separate channel at one side of the first mentioned channel, and rolls between the side walls of adjoining channels upon one side of the section and engaging said side walls for bending the side walls of each channel toward each other.

17. In a machine of the class described, the combination of a frame, sets of rolls mounted thereon and arranged to receive between them a section of sheet metal, one set of rolls being shaped to form a longitudinal channel in the metal section and succeeding sets of rolls serving to form channels at either side of the first mentioned channel with deflected portions between them, a set of rolls for flattening the deflected portions into a substantially common plane, and means for driving the sets of rolls.

In testimony whereof, I have hercunto subscribed my name.

CARL M. YODER.